United States Patent
Davis

(10) Patent No.: US 7,439,306 B2
(45) Date of Patent: Oct. 21, 2008

(54) POLYETHYLENE BLENDS WITH IMPROVED VICAT SOFTENING POINT

(75) Inventor: Donna Sue Davis, Beaumont, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 288 days.

(21) Appl. No.: 10/995,572

(22) Filed: Nov. 23, 2004

(65) Prior Publication Data

US 2006/0110616 A1    May 25, 2006

(51) Int. Cl.
*C08L 23/00* (2006.01)
*C08L 23/04* (2006.01)

(52) U.S. Cl. .................................... 525/240

(58) Field of Classification Search ............... 525/240
See application file for complete search history.

(56) References Cited

U.S. PATENT DOCUMENTS

| | | | | |
|---|---|---|---|---|
| 5,032,463 | A * | 7/1991 | Smith | 428/520 |
| 5,723,507 | A * | 3/1998 | Markovich et al. | 521/51 |
| 6,306,969 | B1 | 10/2001 | Patel et al. | 525/191 |
| 6,787,220 | B2 | 9/2004 | Wallace et al. | 428/212 |
| 7,056,593 | B2 * | 6/2006 | Kennedy et al. | 428/516 |
| 2001/0002755 | A1 * | 6/2001 | Rowley | 285/354 |

FOREIGN PATENT DOCUMENTS

| | | |
|---|---|---|
| EP | 330 168 B1 | 5/1996 |
| EP | 737 715 A2 | 10/1996 |
| WO | WO 98/24834 | 6/1998 |

OTHER PUBLICATIONS

U.S. Appl. No. 10/803,318, filed Mar. 18, 2004, Ravel et al.

* cited by examiner

*Primary Examiner*—Nathan M Nutter

(57) ABSTRACT

A method of selecting polyethylene components for a polyethylene composition having an improved Vicat softening point comprising blending at least a first polyethylene having a first density and a second polyethylene having a second density to form the polyethylene composition, wherein the first density is greater than the second density, and determining a first Vicat softening point ($V_1$) of the composition measured, and calculating a second Vicat softening point ($V_2$) of the composition using the formula $V_2=[\Sigma_n^1\{W_1$(Vicat softening point of the first polyethylene)$+W_2$(Vicat softening point of the second polyethylene) . . . $W_n$(Vicat softening point of the nth polyethylene)$\}]$, wherein $W_1$ is the weight fraction of the first polyethylene, $W_2$ is the weight fraction of the second polyethylene and $W_n$ is the weight fraction of the nth polyethylene, n ranges from 2 to 10 and $W_1+W_2 \ldots +W_n=1.0$; comparing $V_1$ and $V_2$; selecting the polyethylene components such that $V_1$ is less than $V_2$ for the polyethylene composition.

25 Claims, No Drawings

POLYETHYLENE BLENDS WITH IMPROVED VICAT SOFTENING POINT

FIELD OF INVENTION

This invention relates, generally, to polyethylene compositions. More specifically, this invention relates to processes of identifying and preparing the polyethylene compositions having improved Vicat softening point.

BACKGROUND

Food items such as poultry, fresh red meat and cheese, as well as nonfood industrial and retail goods, are packaged by various shrink wrap methods. Shrink wrap films can be monoaxial or biaxial oriented and are required to possess a variety of film attributes.

There are two main categories of heat shrink films—hot-blown shrink film and oriented shrink wrap film. Hot-blown shrink film is made by a hot-blown simple bubble film process and, conversely, oriented shrink wrap film is made by elaborate biaxial orientation processes known as double bubble, tape bubble, trapped bubble or tenter framing. Both amorphous and semi-crystalline polymers can be made into oriented shrink wrap films using elaborate biaxial orientation processes. For amorphous polymers, the orientation is performed at a temperature immediately above the glass transition temperature of the polymer. For semi-crystalline polymers, the orientation is performed at a temperature below the peak melting point of the polymer.

shrink packaging generally involves placing an item(s) into a bag (or sleeve) fabricated from a shrink wrap film, then closing or heat sealing the bag or sleeve, and thereafter exposing the package to sufficient heat to cause shrinking of the film and intimate contact between the film and item. The heat that induces shrinkage can be provided by conventional heat sources, such as heated air, infrared radiation, hot water, hot oil combustion flames, or the like. Heat shrink wrapping of food items helps preserve freshness, is attractive, is hygienic, and allows closer inspection of the quality of the packaged food item. It is beneficial to expose perishable food to the lowest temperature necessary to induce film shrinkage. Additionally, inducing shrinkage at the lowest possible temperature reduces manufacturing costs. Heat shrink wrapping of industrial and retail goods, which is alternatively referred to in the art and herein as industrial and retail bundling, preserves product cleanliness and also is a convenient means of bundling and collating for accounting and transporting purposes.

The biaxial heat-shrink response of shrink film is obtained by initially stretching fabricated film to an extent several times its original dimensions in both the machine and transverse directions to orient the film. The stretching is usually accomplished while the fabricated film is sufficiently soft or molten, although cold drawn shrink films are also known in the art. After the fabricated film is stretched and while still in a stretched condition, the stretching or orientation is frozen or set by quick quenching of the film. Subsequent application of heat will then cause the oriented film to relax and, depending on the actual shrink temperature, the oriented film can return essentially back to its original unstretched dimensions, i.e., to shrink relative to its stretched dimension.

In the past, it was believed that the shrink temperature of polyolefin films was based on a linear function of density. For example, U.S. Pat. No. 6,306,969 teaches that polyolefin film shrinkage was a function of shrink tension and film density. However, applicants now believe, without wishing to be bound by the theory that shrink temperature is directly proportional to the Vicat softening point, which is nonlinearly proportional to the density of the polyolefin blend. Nonlinearity allows depressing softening temperatures while maintaining performance and cost competitiveness.

It would be beneficial to provide a film having a relatively high toughness i.e., relatively high crystallinity, and having a reduced film orientation temperature and reduced shrink temperature. In this manner, a reduced amount of heat would be necessary to shrink wrap products, while maintaining film toughness. The reduced heat translates into reduced energy cost as well as reducing the amount of heat to which the contents of the film are exposed.

There exists a need for polyethylene compositions, for use in shrink wrap products, having reduced shrink temperature.

SUMMARY OF THE INVENTION

Applicant has discovered unexpected methods of identifying polyethylene components for use in a polyethylene composition that may be used in shrink wrap products having reduced shrink temperature and methods for preparing the polyethylene compositions.

One embodiment of the present invention provides a method of selecting polyethylene components for a polyethylene composition having an improved Vicat softening point comprising blending at least a first polyethylene having a first density and a second polyethylene having a second density to form the polyethylene composition, wherein the first density is greater than the second density, and determining a first Vicat softening point ($V_1$) of the composition, and calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_1$ is the weight fraction of the nth polyethylene, n ranges from 2 to 10 and $W_1 + W_2 \ldots + W_n = 1.0$; comparing $V_1$ and $V_2$; and selecting the polyethylene components such that $V_1$ is less than $V_2$ for the polyethylene composition.

One embodiment according to the present invention provides a method of selecting polyethylene components for a polyethylene composition having an improved Vicat softening point comprising blending at least a first polyethylene having a first melt index and a second polyethylene having a second melt index to form the polyethylene composition, wherein the first melt index is greater than the second melt index, determining a first Vicat softening point ($V_1$) of the composition, calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1 + W_2 \ldots + W_n = 1.0$; comparing $V_1$ and $V_2$; and selecting the polyethylene components such that $V_1$ is less than $V_2$ for the polyethylene composition.

One embodiment of the invention provides a method of preparing a polyethylene composition having an improved Vicat softening point comprising blending at least a first polyethylene having a first density and a second polyethylene having a second density to form the polyethylene composition, wherein the first density is greater than the second density, and determining a first Vicat softening point ($V_1$) of the composition, and calculating a second Vicat softening point ($V_2$) of the composition using the formula $$V_2=[\Sigma^1{}_n\{W_1(\text{Vicat softening point of the first polyethylene})+W_2(\text{Vicat softening point of the second polyethylene})\ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10 and $W_1+W_2\ldots+W_n=1.0$; comparing $V_1$ and $V_2$; and selecting the polyethylene composition such that $V_1$ is less than $V_2$.

One embodiment according to the present invention provides a method of preparing a polyethylene composition having an improved Vicat softening point comprising blending at least a first polyethylene having a first melt index and a second polyethylene having a second melt index to form the polyethylene composition, wherein the first melt index is greater than the second melt index, and determining a first Vicat softening point ($V_1$) of the composition, calculating a second Vicat softening point ($V_2$) of the composition using the formula $$V_2=[\Sigma^1{}_n\{W_1(\text{Vicat softening point of the first polyethylene})+W_2(\text{Vicat softening point of the second polyethylene})\ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2\ldots+W_n=1.0$; comparing $V_1$ and $V_2$; and selecting the polyethylene components such that $V_1$ is less than $V_2$ for the polyethylene composition.

One embodiment according to the present invention provides a method of making a shrink film, the method comprising preparing a polyethylene composition comprising at least a first polyethylene having a first density and a second density, wherein the first density is greater than the second density, determining a first Vicat softening point ($V_1$) of the composition, calculating a second Vicat softening point ($V_2$) of the composition using the formula $$V_2=[\Sigma^1{}_n\{W_1(\text{Vicat softening point of the first polyethylene})+W_2(\text{Vicat softening point of the second polyethylene})\ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2\ldots+W_n=1.0$; comparing $V_1$ and $V_2$; and selecting the polyethylene components such that $V_1$ is less than $V_2$ for the polyethylene composition; coextruding a multi-layer film wherein at least one layer comprises the polyethylene composition wherein $V_1$ is less than $V_2$.

One embodiment according to the present invention provides a method of making a shrink film, the method comprising preparing a polyethylene composition comprising at least a first polyethylene having a first melt index and a second melt index, wherein the first melt index is greater than the second melt index, determining a first Vicat softening point ($V_1$) of the composition, calculating a second Vicat softening point ($V_2$) of the composition using the formula $$V_2=[\Sigma^1{}_n\{W_1(\text{Vicat softening point of the first polyethylene})+W_2(\text{Vicat softening point of the second polyethylene})\ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2\ldots+W_n=1.0$; comparing $V_1$ and $V_2$; and selecting the polyethylene components such that $V_1$ is less than $V_2$ for the polyethylene composition; coextruding a multi-layer film wherein at least one layer comprises the polyethylene composition wherein $V_1$ is less than $V_2$.

In one embodiment n ranges from 2 to 10, preferably from 2 to 5, more preferably from 2 to 4, and most preferably from 2 to 3. In another embodiment, n is 2, i.e., the polyethylene composition comprises a first polyethylene and a second polyethylene.

In one embodiment, the difference between $V_2$ and $V_1$, i.e., $V_2-V_1$ is greater than about 1.5° C., alternatively $V_2-V_1$ is greater than about 5° C., and alternatively $V_2-V_1$ is greater than about 10° C.

In another embodiment, the polyethylene composition comprises at least a first polyethylene having a first density and a second polyethylene having a second density in which the first density is greater than or equal to 0.910 and the second density is less than 0.910.

In another embodiment, the polyethylene composition comprises at least a first polyethylene having a first density and a second polyethylene having a second density in which the difference between the first density and the second density ranges from about 0.01 g/cc to about 0.11 g/cc. Alternatively, the difference between the first density and the second density ranges from about 0.05 g/cc about 0.11 g/cc. Alternatively, the difference between the first density and the second density ranges from about 0.08 g/cc to about 0.11 g/cc. In one embodiment the difference between the density of the polyethylene and the density of the plastomer ranges from 0.01 g/cc to 0.155 g/cc. In another embodiment the difference between the density of the polyethylene and the density of the plastomer ranges from 0.03 g/cc to 0.9 g/cc. In another embodiment the difference between the density of the polyethylene and the density of the plastomer ranges from 0.01 g/cc to 0.05 g/cc.

In one embodiment, the first polyethylene a first melt index and the second polyethylene has a second melt index, each independently selected from the melt index ranging from about 0.1 dg/l minute to about 50 dg/l minute wherein the first melt index is greater than the second melt index.

In one embodiment, the difference between the first melt index and the second melt index ranges from about 0.2 dg/min to about 30 dg/min; alternatively from about 0.2 dg/min to about 20 dg/min; alternatively from about 0.2 dg/min to about 15 dg/min, alternatively from about 0.3 dg/min to about 5 dg/min.

In one embodiment, the first polyethylene comprises from about 1 wt-% to about 99 wt-% of the polyethylene composition based on the total weight of the first polyethylene and the second polyethylene, alternatively from about 10 wt-% to about 99 wt-% of the polyethylene composition, from about 25 wt-% to about 99 wt-% of the polyethylene composition, and alternatively from about 50 wt-% to about 99 wt-% of the polyethylene composition.

In one embodiment, the first polyethylene and the second polyethylene are each independently selected from a metallocene catalyzed polyethylene, a single-size catalyzed polyethylene and a Ziegler-Natta catalyzed polyethylene. In another embodiment, the first polyethylene and the second polyethylene are each independently selected from a plastomer, very low density polyethylene (VLDPE), linear low density polyethylene (LLDPE), low density polyethylene (LDPE), and high density polyethylene (HDPE).

One embodiment according to the present method provides a film comprising an ABA structure, wherein the A layers are skin layers, which may be the same or different, each independently selected from a blend comprising a mPE having a density between about 0.910 to 0.940 g/cc, and the B layer is a core layer comprising a blend of a HDPE and a LDPE. Another embodiment according to the present method provides a film comprising at least one of the A layers further comprising at least one resin selected from HDPE, LDPE and mixtures thereof. Another embodiment according to the present method provides a film wherein the core layer B comprises from about 60 to about 90 wt. % LDPE, and from about 40-10 wt. % HDPE and skin layers A are each independently selected from a blend comprising from about 80 wt. % to about 100 wt. % mPE, from about 20 to about 0 wt. % HDPE and from about 20 to about 0 wt. % LDPE.

Certain embodiments address, inter alia, the need for polyethylene compositions, for use in shrink wrap products, having reduced shrink temperature.

DETAILED DESCRIPTION OF PREFERRED EMBODIMENTS

Applicant has discovered surprising methods of identifying polyethylene components for use in a polyethylene composition that may be used in shrink wrap products having reduced shrink temperature and methods for preparing the polyethylene compositions.

One embodiment of the present invention provides a method of selecting polyethylene components for a polyethylene composition having an improved Vicat softening point comprising blending at least a first polyethylene having a first density and a second polyethylene having a second density to form the polyethylene composition, wherein the first density is greater than the second density, and determining a first Vicat softening point ($V_1$) of the composition, and calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10 and $W_1+W_2 \ldots +W_n=1.0$; comparing $V_1$ and $V_2$; selecting the polyethylene components such that $V_1$ is less than $V_2$ for the polyethylene composition.

One embodiment according to the present invention provides a method of selecting polyethylene components for a polyethylene composition having an improved melt index comprising blending at least a first polyethylene having a first melt index and a second polyethylene having a second melt index to form the polyethylene composition, wherein the first melt index is greater than the second melt index, determining a first Vicat softening point ($V_1$) of the composition, calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2 \ldots +W_n=1.0$; comparing $V_1$ and $V_2$; and selecting the polyethylene components such that $V_1$ is less than $V_2$ for the polyethylene composition.

One embodiment of the invention provides a method of preparing a polyethylene composition having an improved Vicat softening point comprising blending at least a first polyethylene having a first density and a second polyethylene having a second density to form the polyethylene composition, wherein the first density is greater than the second density, and determining a first Vicat softening point ($V_1$) of the composition, and calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10 and $W_1+W_2 \ldots +W_n=1.0$; comparing $V_1$ and $V_2$; and selecting the polyethylene composition such that $V_1$ is less than $V_2$.

One embodiment according to the present invention provides a method of preparing a polyethylene composition having an improved Vicat softening point comprising blending at least a first polyethylene having a first melt index and a second polyethylene having a second melt index to form the polyethylene composition, wherein the first melt index is greater than the second melt index, and determining a first Vicat softening point ($V_1$) of the composition, calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2 \ldots +W_n=1.0$; comparing $V_1$ and $V_2$; and selecting the polyethylene components such that $V_1$ is less than $V_2$ for the polyethylene composition.

One embodiment according to the present invention provides a method of making a shrink film, the method comprising preparing a polyethylene composition comprising at least a first polyethylene having a first density and a second density, wherein the first density is greater than the second density, determining a first Vicat softening point ($V_1$) of the composition, calculating a second Vicat softening point ($V_2$) of the composition using the formula $$V_2 = [\Sigma^1_n \{W_1(\text{Vicat softening point of the first polyethylene}) + W_2(\text{Vicat softening point of the second polyethylene}) \ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2 \ldots +W_n=1.0$; comparing $V_1$ and $V_2$; and selecting the polyethylene components such that $V_1$ is less than $V_2$ for the polyethylene composition; coextruding a multi-layer film wherein at least one layer comprises the polyethylene composition wherein $V_1$ is less than $V_2$.

One embodiment according to the present invention provides a method of making a shrink film, the method comprising preparing a polyethylene composition comprising at least a first polyethylene having a first melt index and a second melt index, wherein the first melt index is greater than the second melt index, determining a first Vicat softening point ($V_1$) of the composition, calculating a second Vicat softening point ($V_2$) of the composition using the formula $$V_2=[\Sigma^1_n\{W_1(\text{Vicat softening point of the first polyethylene})+W_2(\text{Vicat softening point of the second polyethylene})\ldots W_n(\text{Vicat softening point of the nth polyethylene})\}],$$

wherein $W_1$ is the weight fraction of the first polyethylene, $W_2$ is the weight fraction of the second polyethylene and $W_n$ is the weight fraction of the nth polyethylene, n ranges from 2 to 10, and $W_1+W_2\ldots+W_n=1.0$; comparing $V_1$ and $V_2$; and selecting the polyethylene components such that $V_1$ is less than $V_2$ for the polyethylene composition; coextruding a multi-layer film wherein at least one layer comprises the polyethylene composition wherein $V_1$ is less than $V_2$.

In one embodiment according to the invention, n is 2, i.e., the polyethylene composition has two polyethylene components. In another embodiment, n is greater than or equal to three with the proviso that at least one polyethylene component has a density greater than at least one of the other polyethylene components. In another embodiment, n is greater than or equal to four with the proviso that at least one polyethylene component has a density greater than at least one of the other polyethylene components. For ease of discussion, the remainder of the specification will generally refer to polyethylene compositions having two polyethylene components, i.e., a first polyethylene and a second polyethylene, but it is understood that the invention includes polyethylene compositions having more than two polyethylene components.

In one embodiment according to the invention, n is 2, i.e., the polyethylene composition has two polyethylene components. In another embodiment, n is greater than or equal to three with the proviso that at least one polyethylene component has a melt index greater than at least one of the other polyethylene components. In another embodiment, n is greater than or equal to four with the proviso that at least one polyethylene component has a melt index greater than at least one of the other polyethylene components. For ease of discussion, the remainder of the specification will generally refer to polyethylene compositions having two polyethylene components, i.e., a first polyethylene and a second polyethylene, but it is understood that the invention includes polyethylene compositions having more than two polyethylene components.

In one embodiment, the difference between the first and second Vicat softening points, i.e., $V_2-V_1$ is less than about 1.5° C., alternatively $V_2-V_1$ is less than about 5° C., and alternatively $V_2-V_1$ is less than about 10° C. In general, the difference $V_2-V_1$ increases as the difference of the density between the polyethylene components increases. Generally, larger values for the difference $V_2-V_1$ are preferred.

Generally, a large difference in the densities of the polyethylenes blended to form the polyethylene composition is preferred. In one embodiment, the polyethylene composition comprises at least a first polyethylene having a first density and a second polyethylene having a second density in which the first density is greater than or equal to 0.910 and the second density is less than 0.910.

In another embodiment, the polyethylene composition comprises at least a first polyethylene having a first density and a second polyethylene having a second density in which the difference between the first density and the second density ranges from about 0.01 g/cc to about 0.11 g/cc, alternatively, about 0.05 g/cc to about 0.11 g/cc, alternatively from about 0.08 g/cc to about 0.11 g/cc.

In one embodiment the difference between the density of the polyethylene and the density of the plastomer ranges from 0.01 g/cc to 0.155 g/cc. In another embodiment the difference between the density of the polyethylene and the density of the plastomer ranges from 0.03 g/cc to 0.09 g/cc. In another embodiment the difference between the density of the polyethylene and the density of the plastomer ranges from 0.01 g/cc to 0.05 g/cc.

In one embodiment, the first polyethylene a first melt index and the second polyethylene has a second melt index, each independently selected from the melt index ranging from about 0.1 dg/1 minute to about 50 dg/1 minute wherein the first melt index is greater than the second melt index. In one embodiment, the difference between the first melt index and the second melt index ranges from about 0.2 dg/min to about 30 dg/min; alternatively from about 0.2 dg/min to about 20 dg/min, alternatively from about 0.2 dg/min to about 15 dg/min; alternatively from about 0.1 dg/min to about 15 dg/min, alternatively from about 0.3 dg/min to about 5 dg/min.

In one embodiment, the first polyethylene comprises from about 1 wt-% to about 99 wt-% of the polyethylene composition based on the total weight of the first polyethylene and the second polyethylene, alternatively from about 10 wt-% to about 99 wt-% of the polyethylene composition, alternatively from about 25 wt-% to about 99 wt-% of the polyethylene composition, and alternatively from about 50 wt-% to about 99 wt-% of the polyethylene composition. In another embodiment, the weights of the polyethylenes are selected such that the weight average density of the polyethylene composition is approximately equal to a predetermined target density.

In one embodiment, the first polyethylene and the second polyethylene are each independently selected from a single site catalyzed polyethylene, metallocene catalyzed polyethylene and a Ziegler-Natta catalyzed polyethylene. In another embodiment, the first polyethylene and the second polyethylene are each independently selected from a plastomer, VLDPE, LLDPE, LDPE and HDPE. Any combination of these polyethylenes may be used to form the polyethylene composition provided that the first polyethylene and second polyethylene have different densities and/or different melt indices.

One embodiment according to the present method provides a film comprising an ABA structure, wherein the A layers are skin layers, which may be the same or different, each independently selected from a blend comprising a mPE having a density between about 0.910 to 0.940 g/cc, and the B layer is a core layer comprising a blend of a HDPE and a LDPE. Another embodiment according to the present method provides a film comprising at least one of the A layers further comprising at least one resin selected from HDPE, LDPE and mixtures thereof. Another embodiment according to the present method provides a film wherein the core layer B comprises from about 60 to about 90 wt. % LDPE, and from about 40-10 wt. % HDPE and skin layers A are each independently selected from a blend comprising from about 80 wt. % to about 100 wt. % mPE, from about 20 to about 0 wt. % HDPE and from about 20 to about 0 wt. % LDPE. Examples of films that may be made by this method are found in U.S. Ser. No. 10/803,318, filed Mar. 18, 2004, which is fully incorporated by reference.

Polyethylene, as used herein, can be a homopolymer or a copolymer of a plastomer, VLDPE, LLDPE, LDPE and HDPE. VLDPE typically has a density in the range of from 0.91 to 0.915 g/cc. LLDPE has a density in the range of from 0.915 to 0.940 g/cc. LDPE has a density in the range of from 0.910 to 0.940 g/cc. HDPE typically has a density in the range of from 0.940 to 0.960 g/cc. Densities were measured using ASTM 1505.

For purposes of this invention and the claims thereto, an ethylene polymer having a density of 0.85 g/cc or less is referred to as an elastomer, an ethylene polymer having a density of more than 0.85 to less than 0.910 g/cc is referred to as a plastomer. Plastomers refer generally to a class of ethylene based copolymers having a weight average molecular weight (Mw) greater than about 20,000 (about 200 MI or lower). Plastomers have an ethylene crystallinity between plastics (i.e. linear low density and very low density polyethylenes) and ethylene/alpha-olefin elastomers.

For the purposes of this patent specification the term "metallocene" is defined to contain one or more cyclopentadienyl moiety in combination with a transition metal. The metallocene catalyst component is represented by the general formula (Cp)m MRn R'p wherein Cp is a substituted or unsubstituted cyclopentadienyl ring; M is a Group IV, V or VI transition metal; R and R' are independently selected halogen, hydrocarbyl group, or hydrocarboxyl groups having 1-20 carbon atoms; m=1-3, n=0-3, p=0-3, and the sum of m+n+p equals the oxidation state of M. The metallocene can be substituted with principally hydrocarbyl substituent(s) but not to exclude a germanium, a phosphorous, a silicon or a nitrogen atom containing radical or unsubstituted, bridged or unbridged or any combination.

Various forms of the catalyst system of the metallocene type may be used in the polymerization process of this invention. Exemplary of the development of these metallocene catalysts for the polymerization of ethylene is found in U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. There are a variety of methods for preparing alumoxane one of which is described in U.S. Pat. No. 4,665,208.

Other cocatalysts may be used with metallocenes, such as trialkylaluminum compounds; or ionizing ionic activators or compounds such as, tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0 520 732, EP-A-0 277 003 and EP-A-0 277 004 both published Aug. 3, 1988 and U.S. Pat. Nos. 5,153,151 and 5,198,401 and are all herein fully incorporated by reference.

In one embodiment, the metallocene catalyst component can be a monocyclopentadienyl heteroatom containing compound. This heteroatom containing metallocene catalyst is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257, all of which are fully incorporated herein by reference.

Other metallocene-type catalysts useful herein are those Group 5 and 6 metal imido complexes described in EP-A2-0 816 384 and U.S. Pat. No. 5,851,945, which is incorporated herein by reference. In addition, metallocene-type catalysts useful herein include bridged bis(arylamido) Group 4 compounds described by D. H. McConville, et al., in Organometallics 1195, 14, 5478-5480, which is herein incorporated by reference. Other metallocene-type catalysts useful herein are described as bis(hydroxy aromatic nitrogen ligands) in U.S. Pat. No. 5,852,146, which is incorporated herein by reference. Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

still other useful catalysts include those multinuclear metallocene catalysts as described in WO 99/20665 and U.S. Pat. No. 6,010,794, and transition metal metaaracycle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference. The catalyst compositions of the invention may include one or more complexes known as transition metal catalysts based on bidentate ligands containing pyridine or quinoline moieties, such as those described in U.S. Pat. No. 6,103,657, which is herein incorporated by reference.

A number of single-site catalysts other than metallocenes are known. Recent articles have disclosed several non-metallocene single-site catalysts. The Apr. 13, 1998 issue of Chemical and Engineering News describes a method a producing complexes of iron (II) and cobalt (II) with 2,6 bis-(imino)pyridyl ligands. These single-site catalysts reportedly produce polymers with narrow molecular weight distributions, and a uniform molecular architecture. Similarly, Brookhart et al., at the Sixth International Business Forum on Specialty Polyolefins, September, 1996, reported a class of nickel (II) and palladium (II) complexes which serve as active catalysts for the polymerization of ethylene and alpha-olefins. These complexes feature a substituted alpha-diimine ligand. Brookhart reports that by varying, among other things, the catalyst structure the degree and type of polymer branching can be controlled. Cribbs et al., Antec, 1998, S.P.E., discloses several single-site catalysts other than metallocene. These include diimide complexes of nickel and palladium, and complexes of 1,4,7-triazacyclononane with rhodium, chromium, and scandium. Cribbs also discloses a process for forming non-metallocene single-site catalysts that consists of deprotonating pyroles or indoles to form a monoanion, and then reacting the monoanion with $TiCl_4$ or $ZrCl_4$ to form the single-site catalysts. This catalyst, when co-catalyzed with a sizable excess of methylalumoxane, has been found to polymerize ethylene to narrow molecular weight distribution polyethylene. Cribbs also discloses boratabenzene complexes of the Group 4 or 5 metals, and reports that these complexes show good activity in ethylene polymerization and that the molecular weights of the product can be varied by changing the substituents on the boron atom. In the December 1997 issue of Chemtech, Montagna discloses several examples of non-metallocene single-site catalysts, including the Brookhart catalyst and the McConville catalyst, which is a zirconium complex stabilized by diamide ligands. International patent application PCT WO96/23010 discloses several additional single-site catalysts. These include transition metal complexes, typically nickel or palladium complexes, having an alpha-diimine ligand.

In addition, the metallocene catalysts useful in this invention can include non-cyclopentadienyl catalyst components, or ancillary ligands such as boroles or carbollides in combination with a transition metal. Additionally, the scope of this invention includes catalysts and catalyst systems as those described in U.S. Pat. No. 5,064,802 and PCT publications WO 93/08221 and WO 93/08199 published Apr. 29, 1993, all of which are herein incorporated by reference. All the catalyst systems described above may be, optionally, prepolymerized or used in conjunction with an additive or scavenging component to enhance catalytic productivity.

The catalyst particles in a gas phase process may be supported on a suitable particulate material such as polymeric supports or inorganic oxide such as silica, alumina or both. Methods of supporting the catalyst of this invention are described in U.S. Pat. Nos. 4,808,561, 4,897,455, 4,937,301, 4,937,217, 4,912,075, 5,008,228, 5,086,025, 5,147,949, 5,238,892 and 5,240,894, all of which are herein incorporated by reference.

Methods of preparing traditional Ziegler-Natta polymers are disclosed in U.S. Pat. No. 4,719,193, which is incorporated herein by reference. Other references include U.S. Pat. No. 4,438,238, V. B. F. Mathot and M. F. J. Pijpers, J. Appl. Polym. Sci., 39, 979 (1990), and S. Hosoda, Polymer Journal, 20, 383 (1988).

The polyethylenes contemplated in certain embodiments of the present invention include ethylene alpha-olefin copolymers. By copolymers we intend combinations of ethylene and one or more alpha-olefins. In general the alpha-olefins comonomers can be selected from those having 3 to 20 carbon atoms, such as $C_3$-$C_{20}$ α-olefins or $C_3$-$C_{12}$ α-olefins. Suitable α-olefin comonomers can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly preferred comonomers are 1-butene, 1-hexene and 1-octene. Specifically the combinations may include ethylene 1-butene; ethylene 1-pentene; ethylene 4-methyl-1-pentene; ethylene 1-hexene; ethylene 1-octene; ethylene decene; ethylene dodecene; ethylene, 1-butene, 1-hexene; ethylene, 1-butene, 1-pentene; ethylene, 1-butene, 4-methyl-1-pentene; ethylene, 1-butene, 1-octene; ethylene, 1-hexene, 1-pentene; ethylene, 1-hexene, 4-methyl-1-pentene; ethylene, 1-hexene, 1-octene; ethylene, 1-hexene, decene; ethylene, 1-hexene, dodecene; ethylene, propylene, 1-octene; ethylene, 1-octene, 1-butene; ethylene, 1-octene, 1-pentene; ethylene, 1-octene, 4-methyl-1-pentene; ethylene, 1-octene, 1-hexene; ethylene, 1-octene, decene; ethylene, 1-octene, dodecene; combinations thereof and the like permutations. It should be appreciated that the list of comonomers and combinations above are merely exemplary, and are not intended to be limiting. As used herein, the term "single-site catalyzed polymer" refers to any polymer, copolymer, or terpolymer, and, in particular, any polyolefin polymerized using a single-site catalyst. As used herein, the term "metallocene catalyzed polymer" refers to any polymer, copolymer, or terpolymer, and, in particular, any polyolefin polymerized using a metallocene catalyst. As used herein, the term "Ziegler-Natta catalyzed polymer" refers to any polymer, copolymer, or terpolymer, and, in particular, any polyolefin polymerized using a Ziegler-Natta catalyst.

Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

If a comonomer is used then the monomer is generally polymerized in a proportion of 50.0-99.99, preferably 70-99 and more preferably 80-95 or 90-95 weight percent of monomer with 0.01-30, preferably 3-30 and most preferably 5-20, 5-10 mole percent comonomer. In one embodiment, the first polyethylene has a comonomer content of from about 5 to 15 wt. %, preferably from about 10 to 15 wt. % and the second polyethylene has a comonomer content ranging from about 15 to about 50 wt. %, preferably from about 20 to about 30 wt. %. The actual amount of comonomers will generally define the density range.

Typically the Ziegler-Natta catalyzed polyethylenes have a molecular weight distribution of about 4. The single-site catalyzed polyethylene or the metallocene catalyzed polyethylene will have an approximate molecular weight distribution of less than 3, preferably less than 2.5.

MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques. In one embodiment the single site catalyzed polyethylene has a w-average molecular weight, (Mw) divided by Mn (Mw/Mn), not exceeding 2. The measurement of MWD is described below.

The melt index (MI) of the polymers of the invention are generally in the range of about 0.1 dg/min to about 1000 dg/min, preferably about 0.2 dg/min to about 300 dg/min, more preferably about 0.3 to about 200 dg/min, yet more preferably about 0.5 dg/min to about 100 dg/min, and most preferably about 0.2 dg/min to about 30 dg/min. The ratio of $I_{21}/I_2$ is known as the melt index ratio (MIR). $I_2$ is well known in the art as equivalent to Melt Index (MI). $I_{21}$ is also known as high load melt index (HLMI).

Contemplated densities of the polyethylenes of the invention are in the range of 0.85 to 0.96 g/cc, preferably 0.87 to 0.940 g/cc, more preferably 0.88 to about 0.935 g/cc. In another embodiment the densities of the polyethylenes are in the range of 0.900 to 0.915 g/cc, 0.915 to 0.940 g/cc, 0.88 to 0.9 g/cc and greater than 0.940 g/cc to 0.96 g/cc.

some embodiments of the present invention include those in which either single site metallocenes, m-polyethylenes and Ziegler-Natta polyethylenes are blended with each other and/or with other components such as plastomer, LDPE, (highly branched, high pressure free radical polymerized) and other ethylene copolymers such as, but not limited to, ethylene vinyl acetate (EVA), ethylene n-butyl acrylate (EnBA), ethylene methyl acrylate (EMA), ethylene ethyl acrylate (EEA), ethylene acrylic acid (EAA), ethylene methacrylic acid (EMAA), and ionomers of the acids, terpolymers such as ethylene, vinyl acetate, methyl acrylate; ethylene, methyl acylate, acrylic acid; ethylene, ethyl acrylate, acrylic acid; ethylene, methyl acrylate, methacrylic acid; ethylene, methylacrylate, methacrylic acid; and mixtures thereof.

In a particular embodiment, the polyethylene composition is at least one of a plastomer, VLDPE, LLDPE, LDPE, or HDPE produced in a series of two reactors or, alternatively, a series of three or more reactors. Each of the reactors may utilize a Ziegler-Natta catalyst, a metallocene catalyst or a single-site catalyst. In one embodiment, a first Ziegler-Natta catalyst may be used in the first reactor to form a first polyethylene and a second Ziegler-Natta catalyst used in the second reactor to form a second polyethylene with the first and second polyethylenes having different density and/or melt index. In another embodiment, a first metallocene catalyst may be used in the first reactor to form a first polyethylene and a second metallocene catalyst used in the second reactor to form a second polyethylene with the first and second polyethylenes having different density and/or melt index. In one embodiment, a Ziegler-Natta catalyst may be used in the first reactor to form a first polyethylene and a metallocene catalyst used in the second reactor to form a second polyethylene with the first and second polyethylenes having different density and/or melt index. Alternatively, the metallocene catalyst may be used in the first reactor and the Ziegler-Natta catalyst used in the second reactor to form a second polyethylene with the first and second polyethylenes having different density and/or melt index. Alternatively, two catalysts, each independently selected from a Ziegler-Natta catalyst, a metallocene catalyst and a single site may be used in the same reactor. If desired, hydrogen can be added as a chain-termination agent to control molecular weight, and the amount of hydrogen used in each reactor can be different. Typical operating pressures are less than about 1 MPa, and typical operating temperatures are from about 70° C. to about 90° C. (about 158° F. to about 194° F.). Series reactors and slurry processes for producing polyethylene resins therein are well known in the art.

The reactors in series are independently selected from slurry loop reactors, gas phase reactors, fluidized bed reactors, and solution phase reactors, all of which are conventional reactors known to one of ordinary skill in the art.

Alternatively, the polyethylene composition can be a physical blend of two or more polyethylenes, having at least different densities or different melt indices, the composition being formed by mixing the polyethylenes in a conventional mixer, such as a Banbury mixer. Alternatively, the polyethylene composition is a physical blend of a first polyethylene having a first density and a first melt index and a second polyethylene having a second density and a second melt index. Alternatively, the polyethylene composition is a physical blend of at least a first polyethylene having a first density and a first melt index and a second polyethylene having a second density and a second melt index. The terms "blend" or "blending" also encompass preparing a first polyethylene in a first reactor, conveying the first polyethylene into a second reactor and making a second polyethylene in the presence of the first polyethylene to form a blend of the first and second polyethylenes, i.e., the reactors are in series. The terms "blend" or "blending" also encompass preparing a first polyethylene and a second polyethylene in the same reactor by the introduction of two different catalysts. The two different catalysts may be introduced into the reactor sequentially or simultaneously.

The polyethylene composition is processed in a mixer, such as a co- or counter-rotating, intermeshing or non-intermeshing twin screw mixer. Such mixers are well known in the art, and are commercially available from various sources, such as Kobe and Farrel. The first polyethylene and the second polyethylene are fed to the feeding zone of the mixer, where the temperature is below the melting temperature of the polyethylenes as the polyethylenes are compressed and conveyed toward the melt-mixing zone. Typically, the temperature in the feeding zone is about 20° C. to about 100° C. (about 68° F. to about 212° F.), and is maintained by cooling the extruder walls. In the melt-mixing zone, the temperature is increased to at least partially melt the resin. In the melt zone, the temperature is sufficient to melt essentially all of the polyethylenes to provide a molten polyethylene composition. The temperature in the melt zone should be between about 420° F. (216° C.) to about 500° F. (260° C.), preferably between about 425° F. (218° C.) to about 450° F. (232° C.). Each zone is only partially filled with the polyethylene composition; i.e., there are no completely filled zones. Although the terms "mixer" and "extruder" are often used loosely and interchangeably, one skilled in the art will appreciate that mixers, such as the commercially available Kobe or Farrel mixers, operate at relatively low pressures, typically about 100 psi (689 kPa) or less, and the zones within the mixer are generally not completely filled with resin. In contrast, extruders, such as are commercially available from, for example, Werner-Pfleiderer, operate at much higher pressures, typically at least several hundred or several thousand psi, and the various zones within the extruder are generally completely filled with polyethylenes.

The first polyethylene and second polyethylene can be blended together in ratios ranging from 1:1 to 0.1:1, respectively, and ratios ranging from 1:1 to 1:0.1, respectively. In an alternative embodiment the first polyethylene and second polyethylene can be blended together in ratios ranging from 1:1 to 0.5:1, respectively, and ratios ranging from 1:1 to 1:0.5, respectively. In an alternative embodiment the first polyethylene and second polyethylene can be blended together in ratios ranging from 1:1 to 0.33:1, respectively, and ratios ranging from 1:1 to 1:0.33, respectively.

TABLE 1

Vicat Softening Point Data for Polyethylene Composition

| FRACTION 0.920 g/cc | FRACTION 0.905 g/cc | FRACTION 0.930 g/cc | SOFTENING POINT, ° C. | FRACTION Exact 4049 | FRACTION HD6706 |
|---|---|---|---|---|---|
| 1 | 0 | 0 | 109.6 | | |
| 1 | 0 | 0 | 109.3 | | |
| 1 | 0 | 0 | 109 | | |

TABLE 1-continued

Vicat Softening Point Data for Polyethylene Composition

| FRACTION 0.920 g/cc | FRACTION 0.905 g/cc | FRACTION 0.930 g/cc | SOFTENING POINT, ° C. | FRACTION Exact 4049 | FRACTION HD6706 |
|---|---|---|---|---|---|
| 0 | 0 | 1 | 120.5 | | |
| 0 | 0 | 1 | 121.6 | | |
| 0 | 0 | 1 | 120.1 | | |
| 0 | 1 | 0 | 94 | | |
| 0 | 1 | 0 | 94.5 | | |
| 0 | 1 | 0 | 94.3 | | |
| 0 | 0.5 | 0.5 | 104.1 | | |
| 0 | 0.5 | 0.5 | 106.6 | | |
| 0 | 0.5 | 0.5 | 104.6 | | |
| | | | 123 | | 1 |
| | | | 71.1 | 0.33 | 0.67 |
| | | | 69.8 | 0.33 | 0.67 |
| | | | 72.6 | 0.33 | 0.67 |
| | | | 63.6 | 0.5 | 0.5 |
| | | | 63.1 | 0.5 | 0.5 |
| | | | 66.7 | 0.5 | 0.5 |
| | | | 61.1 | 0.67 | 0.33 |
| | | | 64.2 | 0.67 | 0.33 |
| | | | 63.3 | 0.67 | 0.33 |
| | | | 123.4 | 0 | 1 |
| | | | 124.3 | 0 | 1 |
| | | | 124.3 | 0 | 1 |

EXAMPLES

Example 1

A polyethylene composition made by physically blending, in a 1:1 ratio by weight, a polyethylene having a density of 0.905 g/cc and a Vicat softening point of 94.3° C. and a polyethylene having a density of 0.935 g/cc and a Vicat softening point of 120.7° C. The polyethylene composition had a target density of 0.920 g/cc. The polyethylene blend had a measured Vicat softening point of 105.1° C. compared to the calculated average of 107.5° C., as shown in Table 1. All Vicat softening point values are an average of three measurements.

Example 2

A series of polyethylene compositions were made by physically blending EXACT™ 4049 plastomer having a density of 0.874 and a polyethylene HD6706 having a density of 0.9525 g/cc. The blends were made in a 1:2, 1:1, and 2:1 weight ratio of EXACT™ 4049 and HD6706, respectively. Table 1 shows the resulting Vicat softening point measurements.

Example 3

A blend of two metallocene-catalyzed ethylene hexene copolymers was prepared by mixing a polyethylene, having a Vicat softening point of 112.2° C., a 2.9 MI, and a density of 0.920 g/cc; and a polyethylene, having a Vicat softening point of 106.1° C., a 0.43 MI and a density of 0.919 g/cc on a 1:1 weight basis. The blend had a measured Vicat softening point of 108.2° C. compared to a calculated Vicat softening point of 109.2° C.

The data in Table 1 for EXACT™ 4049 polyethylene and HD6706 show that the relationship of Vicat softening Point versus the fraction of EXACT™ 4049 in HD6706 is not linear. The data in Table 1 for the 1:1 blend of the 0.905 g/cc polyethylene and the 0.930 g/cc polyethylene show a non-linear relationship. Additionally, without wishing to be bound by the theory, a comparison of these two cases suggests that the more immiscible the blends, the larger the nonlinear effect.

The Vicat softening point in accordance with the ASTM D-1525 is the temperature at which a flat ended needle of 1 $mm^2$ circular cross section will penetrate a thermoplastic specimen to a depth of 1 mm under a specified load and temperature. The test specimen is molded or cut from a sheet with a specified minimum thickness and width. The specimen is placed on support bars and heated at a selected uniform rate of temperature rise. The needle is lowered such that it rests on the surface of the specimen. When the needle penetrates 1 mm, the temperature recorded is the Vicat softening point. The data obtained from this test is useful in comparing the heat softening qualities of thermoplastic materials. Generally, thermoplastic products with a higher Vicat softening point tend to be harder to penetrate, whereas a lower Vicat softening point indicates a softer product.

Vicat Softening Point

ASTM-1525 with a 1000 g weight.

Density

Density in g/cc is determined in accordance with ASTM 1505, based on ASTM D-4703-00, procedure C, plaque preparation. A plaque is made and conditioned for at least forty hours at 23° C. to approach equilibrium crystallinity, measurement for density is then made in a density gradient column.

Gel Permeation Chromatography (GPC)

Gel Permeation Chromatography is a liquid chromatography technique widely used to measure the molecular weight (MW) and molecular weight distributions (MWD) or polydispersity of polymers. This is a common and well-known technique. Such characteristics, as described here, have been measured using the broadly practiced techniques as described below.

Equipment and Reagents Used:

Waters model 150C chromatograph; three (3) Mixed B PL-Gel Columns from Polymer Labs (mixed bed) columns; and 1, 2, 4-trichlorobenzene (HPLC grade) as solvent with a Refractive Index Detector.

Operating Conditions:

Temperature: 145° C.; Flow rate: 0.5 ml/min; Run time: 60 min; and on vol.: 300 microliters (ul).

Sample Preparation:

samples are prepared by weighing 0.5 mg/ml TCB into a 20 ml vial. 10 ml of trichlorobenzene (TCB) is added and the mixture is shaken in a 160° C. oven for two hours until the entire sample is dissolved. The solutions are then transferred to auto-sampler vials and placed in the 150C GPC.

Calibration:

The instrument is calibrated by using narrow MWD standards and fitting the results to a second order calibration curve. The standards are polystyrene and the MW is calculated using the appropriate Mark-Houwink constants.

Data Acquisition and Evaluation:

Data are acquired using Waters Millineum software and all calculations performed TriSEC software installed on a PC computer.

Melt Flow Rate (MFR)

MFR is measured according to ASTM D-1238 test method, at 190° C. and 2.16 kg load, and is expressed as dg/min or g/10 min. It is also referred to as the Melt Index (MI). The $I_{21}$ is measured under the same conditions except that a 21.6 kg load is used.

The ratio of $I_{21}/I_2$ is known as the melt index ratio (MIR) and for the purposes of this patent specification the ratio is also defined to be melt flow ratio (MFR). MIR is generally proportional to the MWD.

All patents, test procedures, and other documents cited herein, including priority documents, are fully incorporated by reference to the extent such disclosure is not inconsistent with this invention and for all jurisdictions in which such incorporation is permitted.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

I claim:

1. A method for preparing a polyethylene composition, comprising:

blending at least a first polyethylene component having a first density and first Vicat softening point and a second polyethylene component having a second density and second Vicat softening point, wherein:

the first density is greater than or equal to 0.910 g/cc and the second density is less than 0.910 g/cc;

a difference between the first density and the second density ranges from about 0.01 g/cc to about 0.11 g/cc;

the polyethylene components are blended in an amount sufficient to provide a Vicat softening point of the blend composition ($V_1$) that is at least 1.5° C. less than a calculated Vicat softening point of a theoretical blend ($V_2$) based on a weight average of the individual polyethylene components; and the Vicat softening point is measured according to ASTM D-1525.

2. The method according to claim 1, wherein the difference between the first density and the second density is from about 0.05 g/cc to about 0.11 g/cc.

3. The method according to claim 2, wherein the difference between the first density and the second density is from about 0.08 g/cc to about 0.11 g/cc.

4. The method according to claim 1, wherein the first polyethylene and the second polyethylene are each independently selected from a metallocene catalyzed polyethylene, a single site catalyzed polyethylene and a Ziegler-Natta catalyzed polyethylene.

5. The method according to claim 1, wherein the first polyethylene and the second polyethylene each have a melt index, $I_{2.16}$, independently selected from the melt index ranging from about 0.1 dg/minute to about 15 g/minute.

6. The method according to claim 1, wherein the first polyethylene comprises from about 1 wt-% to about 99 wt-% of the polyethylene composition based on the total weight of the first polyethylene and the second polyethylene.

7. The method according to claim 6, wherein the first polyethylene comprises from about 10 wt-% to about 99 wt-% of the polyethylene composition based on the total weight of the first polyethylene and the second polyethylene.

8. The method according to claim 6, wherein the first polyethylene comprises from about 25 wt-% to about 99 wt-% of the polyethylene composition based on the total weight of the first polyethylene and the second polyethylene.

9. The method according to claim 6, wherein the first polyethylene comprises from about 50 wt-% to about 99 wt-% of the polyethylene composition based on the total weight of the first polyethylene and the second polyethylene.

10. The method according to claim 1, wherein the first polyethylene and the second polyethylene are each independently selected from a plastomer, VLDPE, LLDPE, LDPE and HDPE.

11. The method according to claim 1, wherein $V_2-V_1$ is greater than about 5° C., as determined by ASTM D-1525.

12. The method according to claim 1, wherein $V_2-V_1$ is greater than about 10° C., as determined by ASTM D-1525.

13. A method for preparing a polyethylene composition, comprising:

blending at least a first polyethylene component having a first density and first Vicat softening point and a second polyethylene component having a second density and second Vicat softening point, wherein:

the first density is greater than or equal to 0.910 g/cc and the second density is less than 0.910 g/cc;

a difference between the first density and the second density ranges from about 0.01 g/cc to about 0.11 g/cc;

the polyethylene components are blended in an amount sufficient to provide a Vicat softening point of the blend composition ($V_1$) that is at least 1.5° C. less than a calculated Vicat softening point of a theoretical blend ($V_2$) based on a weight average of the individual polyethylene components;

the Vicat softening point is measured according to ASTM D-1525; and a difference in melt index of the polyethylene components ranges from about 0.2 dg/min to about 30 dg/min, as measured by ASTM D-1238 at 190° C. and 2.16 kg load.

14. The method of claim 13, wherein the difference in melt index of the polyethylene components ranges from about 0.2 dg/min to about 20 dg/min.

15. The method of claim 13, wherein the difference in melt index of the polyethylene components ranges from about 0.3 dg/min to about 5 dg/min.

16. The method of claim 13, wherein the difference between the first density and the second density is from about 0.05 g/cc to about 0.11 g/cc.

17. The method of claim 13, wherein the difference between the first density and the second density is from about 0.08 g/cc to about 0.11 g/cc.

18. The method of claim 13, wherein $V_2-V_1$ is greater than about 5° C., as determined by ASTM D-1525.

19. The method of claim 13, wherein rein $V_2-V_1$ is greater than about 10° C., as determined by ASTM D-1525.

20. The method of claim 13, wherein the first polyethylene and the second polyethylene each have a melt index, $I_{2.16}$, independently selected from the melt index ranging from about 0.1 dg/minute to about 15 g/minute.

21. The method of claim 13, wherein the first polyethylene comprises from about 1 wt-% to about 99 wt-% of the polyethylene composition based on the total weight of the first polyethylene and the second polyethylene.

22. The method of claim 13, wherein the first polyethylene comprises from about 10 wt-% to about 99 wt-% of the polyethylene composition based on the total weight of the first polyethylene and the second polyethylene.

23. The method of claim 1, wherein the difference in melt index of the polyethylene components ranges from about 0.2 dg/min to about 20 dg/min.

24. The method of claim 1, wherein the difference in melt index of the polyethylene components ranges from about 0.3 dg/min to about 5 dg/min.

25. The method of claim 5, wherein the difference in melt index of the polyethylene components ranges from about 0.3 dg/min to about 5 dg/min.

* * * * *